(12) United States Patent
Dowling et al.

(10) Patent No.: US 12,030,475 B2
(45) Date of Patent: Jul. 9, 2024

(54) METHOD AND CONTROL SYSTEM FOR CONTROLLING MACHINE

(71) Applicant: Caterpillar Underground Mining Pty. Ltd., South Burnie (AU)

(72) Inventors: Alexander Eli Dowling, Burnie (AU); Jason Prakash Wigg, Ridgley (AU); Brodie Lee Thompson, Ulverstone (AU); Suneel Venkata Kandula, Hyderabad (IN); Sai Praveen Gundlapalli, Chennai (IN); Martyn James Crawford, Ulverstone (AU)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 429 days.

(21) Appl. No.: 17/336,918

(22) Filed: Jun. 2, 2021

(65) Prior Publication Data
US 2021/0380084 A1    Dec. 9, 2021

(51) Int. Cl.
| | |
|---|---|
| *B60T 7/12* | (2006.01) |
| *B60T 8/17* | (2006.01) |
| *B60T 8/171* | (2006.01) |
| *B60T 8/26* | (2006.01) |
| *B60T 13/74* | (2006.01) |
| *B60T 7/04* | (2006.01) |
| *B60T 7/08* | (2006.01) |
| *B60T 8/24* | (2006.01) |

(Continued)

(52) U.S. Cl.
CPC ............ *B60T 7/122* (2013.01); *B60T 8/1701* (2013.01); *B60T 8/171* (2013.01); *B60T 8/26* (2013.01); *B60T 13/745* (2013.01); *B60T 2201/06* (2013.01)

(58) Field of Classification Search
None
See application file for complete search history.

(56) References Cited

U.S. PATENT DOCUMENTS

| | | |
|---|---|---|
| 7,212,899 B2 | 5/2007 | Bates et al. |
| 7,641,589 B2 | 1/2010 | Hofler et al. |

(Continued)

FOREIGN PATENT DOCUMENTS

| | | | |
|---|---|---|---|
| DE | 102014200046 B4 | 9/2016 | |
| EP | 0687604 B1 | 12/2002 | |
| RU | 2302954 C1 * | 7/2007 | |

*Primary Examiner* — Aniss Chad
*Assistant Examiner* — Madison R Inserra

(57) ABSTRACT

A method for controlling a machine during a transition from a service brake state to a parking brake includes receiving, by a control module, a request for activating a parking brake assembly. The method also includes transmitting, by the control module, control signals for activating a set of first brakes associated with a service brake assembly, a set of second brakes associated with the service brake assembly, and a clutch assembly. The method further includes controlling, by the control module, the set of first brakes for deactivating the set of first brakes. The method includes controlling, by the control module, the parking brake assembly for activating the parking brake assembly. The method also includes controlling, by the control module, the set of second brakes for deactivating the set of second brakes. The method further includes controlling, by the control module, the clutch assembly for deactivating the clutch assembly.

18 Claims, 5 Drawing Sheets

(51) Int. Cl.
  *B60T 13/66*    (2006.01)
  *B60T 17/22*    (2006.01)
  *B60W 10/02*    (2006.01)
  *B60W 10/18*    (2012.01)
  *B60W 30/18*    (2012.01)
  *E02F 9/20*     (2006.01)

(56) References Cited

U.S. PATENT DOCUMENTS

| | | |
|---|---|---|
| 8,388,498 B2 | 3/2013 | Kodaka et al. |
| 9,809,205 B2 | 11/2017 | Förster et al. |
| 2010/0090522 A1 | 4/2010 | Bensch et al. |
| 2012/0209481 A1 | 8/2012 | Rindfleisch et al. |
| 2019/0084536 A1 | 3/2019 | Burt et al. |
| 2020/0180578 A1* | 6/2020 | Watanabe ............... B60T 8/245 |
| 2021/0277994 A1* | 9/2021 | Runde .................... F02D 13/04 |

* cited by examiner

METHOD AND CONTROL SYSTEM FOR CONTROLLING MACHINE

CROSS-REFERENCE TO RELATED APPLICATION

This application claims priority under 35 USC § 119 and the Paris Convention to Australian Patent Application 2020203698 filed on Jun. 4, 2020.

TECHNICAL FIELD

The present disclosure relates to a method and a control system for controlling a machine. More particularly, the method and the control system allow control of the machine during a transition from a service brake state to a parking brake state.

BACKGROUND

A machine, such as a truck or a wheel loader, may be parked on various surfaces on a worksite. In some instances, such surfaces may include a slope or a ramp having a steep gradient. Further, the machine includes service brakes and parking brakes associated therewith. When the machine needs to be parked, an operator of the machine may switch the machine from a service brake state to a parking brake state. In some cases, there may be a possibility that the machine may rollback during a transition of the machine from the service brake state to the parking brake state due to a design of the service brakes, especially when the machine is positioned on steep gradients. More specifically, the service brakes and the parking brakes at wheel ends include opposing pistons such that when the service brakes are deactivated after the parking brakes are applied, the piston of the parking brakes needs to maintain higher braking force on brake discs. Thus, when the machine is parked on steep slopes with payload, there is a probability of machine rollback during the transition from the service brakes to the parking brakes due to insufficient braking force being applied by the parking brakes. Rolling back of the machine is an undesirable situation and may cause damage to one or more machine components. Some techniques that are being currently used to eliminate the probability of machine rollback may be dependent on operator expertise and may be prone to errors.

EP Patent Number 0,687,604 describes a parking brake operated e.g. by a magnetic valve connected to the brake cylinders of individual wheels and activated by a hand lever on the dashboard via a switch contact. An electronic control unit accepts inputs from the hand lever and from sensors associated with the running brake, accelerator pedal and road speedometer. Its output closes a parallel contact to apply the parking brake when the vehicle is almost at rest from an application of the running brake with the throttle closed.

SUMMARY

In an aspect of the present disclosure, a method for controlling a machine during a transition from a service brake state to a parking brake state is provided. The method includes receiving, by a control module, a request for activating a parking brake assembly. The method also includes transmitting, by the control module, control signals for activating a set of first brakes associated with a service brake assembly of the machine, a set of second brakes associated with the service brake assembly, and a clutch assembly associated with the machine. The method further includes controlling, by the control module, the set of first brakes for deactivating the set of first brakes. The method includes controlling, by the control module, the parking brake assembly for activating the parking brake assembly. The method also includes controlling, by the control module, the set of second brakes for deactivating the set of second brakes. The method further includes controlling, by the control module, the clutch assembly for deactivating the clutch assembly.

In an aspect of the present disclosure, a control system for a work machine including a service brake assembly, a parking brake assembly, and a clutch assembly is provided. The control system includes a control module communicably coupled with the service brake assembly, the parking brake assembly, and the clutch assembly. The control module is configured to receive a request for activating the parking brake assembly. The control module is also configured to transmit control signals for activating a set of first brakes associated with the service brake assembly, a set of second brakes associated with the service brake assembly, and the clutch assembly. The control module is further configured to control the set of first brakes for deactivating the set of first brakes. The control module is configured to control the set of parking brake assembly for activating the parking brake assembly. The control module is also configured to control the set of second brakes for deactivating the set of second brakes. The control module is further configured to control the clutch assembly for deactivating the clutch assembly.

DETAILED DESCRIPTION

Figure 1:
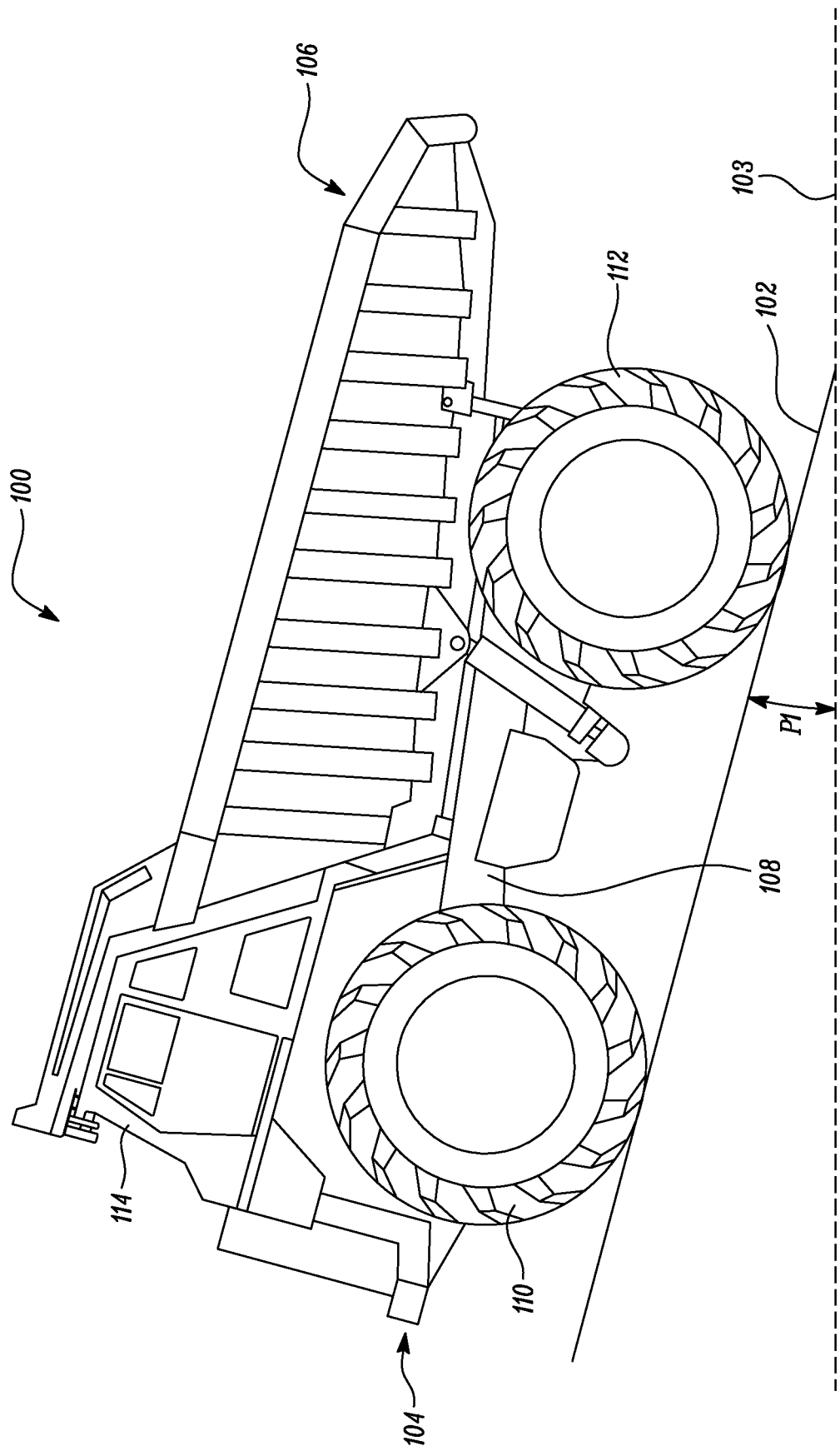
FIG. 1 illustrates a machine positioned on a slope, in accordance with an embodiment of the present disclosure.

Wherever possible, the same reference numbers will be used throughout the drawings to refer to same or like parts. FIG. 1 illustrates a machine 100 positioned on an inclined surface 102. The inclined surface 102 may include a slope, a ramp, or any uneven topographical area. The inclined surface 102 may be present at a worksite on which the machine 100 is operating or the machine 100 may encounter the inclined surface 102 during a travel of the machine 100 from one place to another. The inclined surface 102 causes the machine 100 to be disposed at a pitch angle "P1" relative to a horizontal plane 103. In the illustrated example, the machine 100 is ascending the inclined surface 102. Alternatively, the machine 100 may descend the inclined surface 102. The machine 100 may be hereinafter interchangeably referred to as the work machine 100.

In the illustrated embodiment, the machine 100 is a mining truck. In other embodiments, the machine 100 may include another type of machine, such as a dump truck, loaders such as a load haul dump, or commercial/passenger vehicles, such as a truck, a car, and the like. The machine 100 defines a front end 104 and a rear end 106. Further, the machine 100 defines a frame 108. A power source (not shown), such as an engine or a battery system, may be positioned within an enclosure (not shown) defined by the frame 108. The power source may provide operational power to one or more machine components for an operation thereof.

Further, the machine 100 includes a pair of front wheels 110 disposed proximate to the front end 104 of the machine 100. The machine 100 also includes a pair of rear wheels 112 disposed proximate to the rear end 106 of the machine 100. The wheels 110, 112 allow movement of the machine 100 on various surfaces. The machine 100 includes an operator cabin 114. A machine operator is seated in the operator cabin 114 for operating the machine 100. The operator cabin 114 includes various input and output devices for operating the machine 100. For example, the operator cabin 114 may include a display device that provides various notifications to the machine operator. Further, the operator cabin 114 may also include various indicators, such as a speedometer or a fuel level indicator. Moreover, the operator cabin 114 also includes a parking brake status indicator 116 (shown in FIG. 3) for indicating that a parking brake assembly 118 (shown in FIG. 2) is in an activated state and the machine operator can leave the machine 100. Moreover, a brake pedal (not shown) for manual application of a service brake assembly 120 (shown in FIG. 2), a clutch pedal (not shown) for manual application of a clutch assembly 122 (shown in FIG. 2), a shift lever (not shown) for shifting gears associated with a transmission gearbox (not shown), and an input device 126 (shown in FIG. 2) for providing a request for activating the parking brake assembly 118 is also disposed in the operator cabin 114. The input device 126 may be a foot actuated device or a hand actuated device.

Further, the machine 100 includes the service brake assembly 120, the parking brake assembly 118, and the clutch assembly 122. The machine 100 may halt or a speed of the machine 100 may be reduced based on activation of the service brake assembly 120. When the service brake assembly 120 is activated, the machine 100 is referred to be in a service brake state. The service brake assembly 120 includes a set of first brakes 128 (shown in FIG. 2) and a set of second brakes 130 (shown in FIG. 2). In one example, the set of first brakes 128 is coupled with the set of front wheels 110 of the work machine 100 and the set of second brakes 130 is coupled with the set of rear wheels 112 of the work machine 100. In another example, the set of first brakes 128 is coupled with the set of rear wheels 112 of the work machine 100 and the set of second brakes 130 is coupled with the set of front wheels 110 of the work machine 100. In the embodiment illustrated herein, the service brake assembly 120 includes a pair of first brakes 128 embodied as front brakes associated with the pair of front wheels 110 and a pair of second brakes 130 embodied as rear brakes associated with the pair of rear wheels 112.

The machine operator may manually activate the service brake assembly 120 by operating the brake pedal disposed within the operator cabin 114. Further, the set of first brakes 128 includes a first solenoid 132 (shown in FIG. 3) that allows activation of the set of first brakes 128. Moreover, the set of second brakes 130 includes a second solenoid 134 (shown in FIG. 3) that allows activation of the set of second brakes 130. Each of the set of first brakes 128 and the set of second brakes 130 include a brake piston and a spring. More particularly, a pressure is applied on the spring of the respective first and second brakes 128, 130 to activate the first and second brakes 128, 130. Further, when the pressure being applied on the spring reduces, the parking brake assembly 118 is deactivated.

Further, the service brake assembly 120 includes a brake pedal position sensor 135 (shown in FIG. 3) that generates a signal that indicates if the machine operator is applying pressure on the brake pedal. A first pressure sensor 136 (shown in FIG. 3) is also associated with the set of first brakes 128 that generates a signal corresponding to a first pressure of the set of first brakes 128. Moreover, a second pressure sensor 138 (shown in FIG. 3) is associated with the set of second brakes 130 that generates a signal corresponding to a second pressure of the set of second brakes 130.

The machine 100 also includes the parking brake assembly 118. The parking brake piston and the service brake piston apply pressure on brake discs for realizing braking functions. When the parking brake assembly 118 is activated, the machine 100 is referred to be in a parking brake state. The machine 100 may be switched to the parking brake state based on actuation of the input device 126. The input device 126 is disposed in the operator cabin 114 and is actuated by the machine operator when the machine 100 needs to be switched from the service brake state to the parking brake state. The parking brake assembly 118 described herein is a spring loaded mechanism. The parking brake assembly 118 includes a parking brake piston disposed in an opposing manner relative to the corresponding brake pistons of the set of first and second brakes 128, 130. The parking brake assembly 118 includes a spring associated with the parking brake piston. A pressure is applied on the spring and causes the parking brake assembly 118 to be retained in a deactivated position. Further, when the pressure on the spring reduces, the parking brake assembly 118 is activated. More particularly, when the machine 100 is shut down, a hydraulic pump is in an off position, due to which the pressure in the parking brake assembly 118, specifically, the pressure applied on the spring reduces thereby activating the parking brake assembly 118.

It should be noted that the service brake assembly 120 and the parking brake assembly 118 may include any other combination of braking components, as per application requirements. Further, the parking brake assembly 118 includes a third solenoid 140 (shown in FIG. 3) that allows activation of the parking brake assembly 118. A third pressure sensor 142 (shown in FIG. 3) is also associated with the parking brake assembly 118 that generates a pressure signal corresponding to a third pressure of the parking brake assembly 118. It should be noted that, in the illustrated example, the third pressure may correspond to the pressure that causes the parking brake assembly 118 to be retained in the deactivated position. In one example, the third pressure may be reduced to release the spring associated with the parking brake piston for activation of the parking brake assembly 118.

Further, the clutch assembly 122 is associated with a transmission system of the machine 100. The clutch assembly 122 is used to connect or disconnect the power source from the transmission system. When activated, the clutch assembly 122 brakes a drive line to restrict movement of the machine 100. The clutch assembly 122 may include three clutches. The clutch assembly 122 may be manually activated based on pressing of the clutch pedal present in the operator cabin 114. Further, the clutch assembly 122 includes a clutch assembly solenoid 144 (shown in FIG. 3) that controls activation and deactivation of the clutch assembly 122. The transmission system also includes the transmission gearbox including a number of gears. Further, a gear position sensor 146 (shown in FIG. 3) may be associated with the transmission gearbox. The gear position sensor 146 may provide an indication of a current gear position. A shift lever position sensor 148 (shown in FIG. 3) is also associated with the shift lever disposed in the operator cabin 114. The shift lever position sensor 148 may provide an indication of a current position of the shift lever. Further, the transmission system also includes a speed sensor 150 (shown in FIG. 3) that generates a signal corresponding to an output speed of the transmission system.

Figure 2:
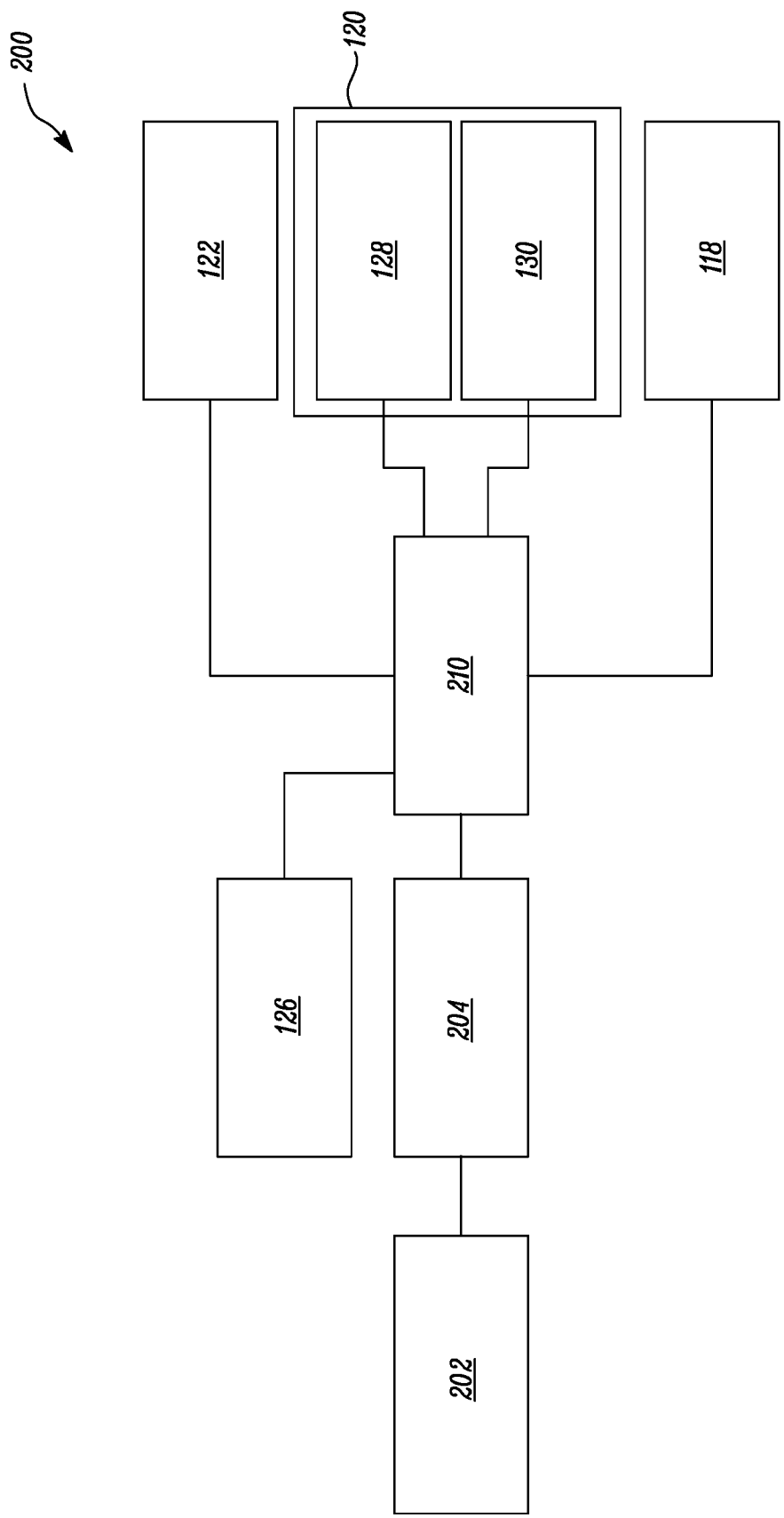
FIG. 2 is a block diagram of a control system associated with the machine of FIG. 1 for transitioning from a service brake state to a parking brake state, in accordance with an embodiment of the present disclosure.

FIG. 2 is a block diagram of a control system 200 associated with the machine 100 (see FIG. 1) for transitioning from the service brake state to the parking brake state. More particularly, the control system 200 controls the machine 100 during the transition of the machine 100 from the service brake state to the parking brake state. The control system 200 includes a sensing module 202. The sensing module 202 generates an input signal corresponding to a value of the pitch angle "P1" (see FIG. 1) of the machine 100. The value of the pitch angle "P1" may correspond to an inclination of the inclined surface 102 on which the machine 100 is positioned. In the illustrated example, the sensing module 202 is embodied as an Inertial Measurement Unit (IMU). Although the sensing module 202 is illustrated as the IMU herein, the sensing module 202 may include any other sensor or group of sensors that generate the input signal corresponding to the value of the pitch angle "P1" of the machine 100. In some embodiments, a dual antenna global positioning system (GPS) may be installed within the sensing module 202. Further, a complementary filter (CF) and a Kalman filter (KF) may be associated within the sensing module 202.

The control system 200 also includes a first control module 204. The first control module 204 is embodied as a machine Electronic Control Module (ECM) herein. The first control module 204 is communicably coupled with the sensing module 202 and receives the input signal corresponding to the value of the pitch angle "P1" from the sensing module 202. Further, the first control module 204 includes a first sub-control module 206 (shown in FIG. 3). The first sub-control module 206 is embodied as a data processing module that receives and processes the input signal received from the sensing module 202. The first sub-control module 206 may be coupled to the sensing module 202 by a secure connection such as a Controller Area Network (CAN) link. The first control module 204 further includes a second sub-control module 208 (shown in FIG. 3) communicably coupled to the first sub-control module 206. The second sub-control module 208 is embodied as a pitch angle transmission module that receives the value of the pitch angle "P1" of the machine 100 from the first sub-control module 206. It should be noted that the first and second sub-control modules 206, 208 read data from the sensing module 202 and forward the same to various other systems/modules of the machine 100.

Further, the control system 200 includes a control module 210. The control module 210 is hereinafter interchangeably referred to as the second control module 210. The second control module 210 is embodied as a chassis ECM. Further, the second control module 210 is communicably coupled with the service brake assembly 120, the parking brake assembly 118, and the clutch assembly 122. The second control module 210 is also communicably coupled with the input device 126.

Figure 3:
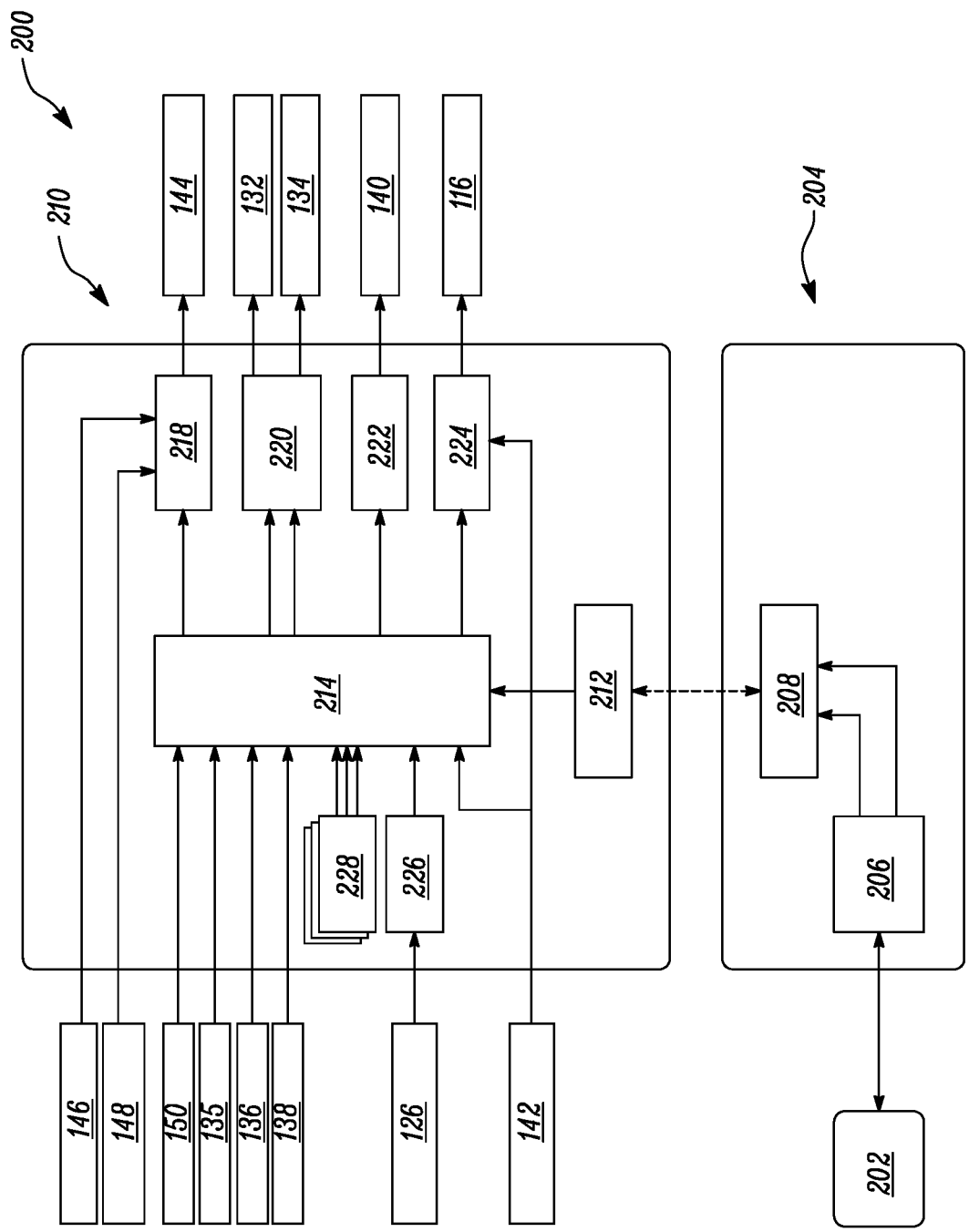
FIG. 3 illustrates the control system of FIG. 2 having a first control module and a second control module, in accordance with another embodiment of the present disclosure.

Referring to FIG. 3, the first control module 204 is coupled to the second control module 210. The second control module 210 receives the value of the pitch angle "P1" (see FIG. 1) from the sensing module 202. More particularly, the second control module 210 includes a third sub-control module 212 that is communicably coupled with the second sub-control module 208 of the first control module 204 by a Common Data Link (CDL). The third sub-control module 212 receives and filters the value of the pitch angle "P1" received from the second control module 210. The second control module 210 further includes a central control module 214. The central control module 214 is communicably coupled with other miscellaneous modules 228 of the second control module 210 that store various processes/algorithms for controlling the service brake assembly 120 or the parking brake assembly 118, as per application requirements. The central control module 214 is communicably coupled to the third sub-control module 212 for receiving the value of the pitch angle "P1" therefrom. Further, the central control module 214 is communicably coupled with the input device 126 via an input module 226. The input module 226 is communicably coupled with the input device 126. Further the input module 226 receives the signal indicative of the request for activating the parking brake assembly 118 from the input device 126, processes the signal, and communicates the signal to the central control module 214. The central control module 214 is also communicably coupled with the brake pedal position sensor 135, the first pressure sensor 136, the second pressure sensor 138, the third pressure sensor 142, and the speed sensor 150.

Further, the central control module 214 is communicably coupled with a clutch assembly module 218. The clutch assembly module 218 is in turn communicably coupled with the clutch assembly solenoid 144. The clutch assembly module 218 is also communicably coupled with the gear position sensor 146 to receive the current gear position. Further, the clutch assembly module 218 is also communicably coupled with the shift lever position sensor 148 to receive the current position of the shift lever associated with the transmission gearbox.

Moreover, the central control module 214 is communicably coupled with a service brake assembly module 220 of the second control module 210. The service brake assembly module 220 is in turn communicably coupled with the first solenoid 132 associated with the set of first brakes 128 and the second solenoid 134 associated with the set of second brakes 130. The central control module 214 is communicably coupled with a parking brake assembly module 222 of the second control module 210. The parking brake assembly module 222 is in turn coupled with the third solenoid 140. The central control module 214 is communicably coupled with an indicator module 224 of the second control module 210. The indicator module 224 is in turn communicably coupled with the parking brake status indicator 116.

An operation of the second control module 210 will now be explained. The second control module 210 allows the machine 100 to transition from the service brake assembly 120 to the parking brake assembly 118. The second control module 210 receives the request for activating the parking brake assembly 118 based on actuation of the input device 126 by the machine operator. More particularly, the central control module 214 receives the request for activating the parking brake assembly 118 from the input device 126 via the input module 226. On receipt of the parking brake request, the second control module 210 determines if one or more parking brake conditions for activating the parking brake assembly 118 have been met. More particularly, the second control module 210 determines if the input device 126 has been actuated and/or the input device 126 is faulted. Further, the second control module 210 may also determine if one or more systems of the machine 100 have requested for an immediate activation of the parking brake assembly 118.

If the second control module 210 determines that the parking brake conditions for activating the parking brake assembly 118 have been met, the second control module 210 determines if one or more conditions for running a routine/process 400 (shown in FIG. 4) for transitioning from the service brake assembly 120 to the parking brake assembly 118 have been met. The conditions for running the routine/process 400 are dependent on the current gear position and the pitch angle "P1" of the machine 100. More particularly, the second control module 210 controls one or more components of the machine 100 during the transition from the service brake assembly 120 to the parking brake assembly 118 only when the machine 100 is in a neutral gear position. Thus, the central control module 214 receives the current shift lever position and the current gear position from the shift lever position sensor 148 and the gear position sensor 146, respectively, to initiate transition from the service brake assembly 120 to the parking brake assembly 118.

Further, the central control module 214 also compares the value of the pitch angle "P1" with a predetermined threshold value. The predetermined threshold value is stored in a memory of the central control module 214. In an example, the predetermined threshold value may be approximately equal to 25%. However, the predetermined threshold value may vary based on a type of the machine 100. Further, if the value of the pitch angle "P1" is greater than the predetermined threshold value, the central control module 214 controls one or more machine components to transition the machine 100 from the service brake state to the parking brake state. More particularly, the control module 210 transmits control signals for activating the set of first brakes 128 associated with the service brake assembly 120, the set of second brakes 130 associated with the service brake assembly 120, and the clutch assembly 122. It should be noted that the control module 210 transmits the control signals for activating the set of first brakes 128, the set of second brakes 130, and the clutch assembly 122 only if the value of the pitch angle "P1" is above the predetermined threshold value. Further, in some examples, the control system 200 may eliminate inputs from the sensing module 202 in situation wherein the machine 100 does not include the sensing module 202 or if the sensing module 202 is faulted. In such examples, the central control module 214 may assume that the pitch angle "P1" is greater than the predetermined threshold value and accordingly control one or more machine components to transition the machine 100 from the service brake state to the parking brake state.

Further, in order to activate the set of first brakes 128, the central control module 214 sends a command signal to the service brake assembly module 220. The service brake assembly module 220 in turn energizes the first solenoid 132 to activate the set of first brakes 128. Further, in order to activate the set of second brakes 130, the central control module 214 sends a command signal to the service brake assembly module 220. The service brake assembly module 220 in turn energizes the second solenoid 134 to activate the set of second brakes 130. Further, in order to activate the clutch assembly 122, the central control module 214 sends a command signal to the clutch assembly module 218. The clutch assembly module 218 in turn energizes the clutch assembly solenoid 144 to activate the clutch assembly 122.

Further, the control module 210 controls the set of first brakes 128 for deactivating the set of first brakes 128. More particularly, the control module 210 controls the set of first brakes 128 to deactivate the set of first brakes 128 based on each of the first pressure of the set of first brakes 128 and the second pressure of the set of second brakes 130 being greater than a first pressure threshold for a predetermined first time period. For this purpose, the central control module 214 receives the value of the first pressure and the second pressure from the first and second pressure sensors 136, 138. If the value of each of the first and second pressures is above the first pressure threshold, the central control module 214 sends a command signal to the service brake assembly module 220 to de-energize the first solenoid 132 for deactivating the set of first brakes 128.

Further, the control module 210 also controls the set of first brakes 128 to deactivate the set of first brakes 128 based on the first pressure of the set of first brakes 128 or the second pressure of the set of second brakes 130 being lesser than the first pressure threshold and a predetermined second time period elapsed from the activation of the set of first brakes 128 and the set of second brakes 130. The predetermined second time period is substantially greater than the predetermined first time period. More particularly, even if the first pressure of the set of first brakes 128 and the second pressure of the set of second brakes 130 is lesser than the first pressure threshold, the central control module 214 commands the service brake assembly module 220 to de-energize the first solenoid 132 for deactivating the set of first brakes 128 after the elapse of the predetermined second time period. In some examples, the central control module 214 may continuously monitor the first and second pressures and if the first and second pressures keep increasing, the central control module 214 commands the service brake assembly module 220 to de-energize the first solenoid 132 for deactivating the set of first brakes 128 after the elapse of the predetermined second time period. In one example, the first pressure threshold, the predetermined first time period, and the predetermined second time period may be stored in a memory associated with the control module 210.

Moreover, the control module 210 controls the parking brake assembly 118 for activating the parking brake assembly 118. For this purpose, the control module 210 determines if the machine operator is applying pressure on the brake pedal based on inputs received from the brake pedal position sensor 135. If the control module 210 determines that the machine operator is applying pressure on the brake pedal, the control module 210 halts all operations until the machine operator stops applying pressure on the brake pedal.

However, if the control module 210 determines that the machine operator is not applying pressure on the brake pedal, the control module 210 continues operation to determine if the parking brake assembly 118 can be activated. More particularly, the control module 210 controls the parking brake assembly 118 to activate the parking brake assembly 118 based on the first pressure of the set of first brakes 128 after deactivating the set of first brakes 128 being lesser than a second pressure threshold for a predetermined third time period. For this purpose, the central control module 214 receives the value of the first pressure from the first pressure sensor 136. If the value of the first pressure sensor 136 is lesser than the second pressure threshold, the central control module 214 sends a command signal to the parking brake assembly module 222 to energize the third solenoid 140 for activating the parking brake assembly 118. In one example, the second pressure threshold and the predetermined third time period may be stored in the memory associated with the control module 210.

Further, the control module 210 controls the set of second brakes 130 to deactivate the set of second brakes 130 based on the third pressure of the parking brake assembly 118 after activation of the parking brake assembly 118 being lesser than a third pressure threshold for a predetermined fourth time period. It should be noted that the third pressure threshold may indicate whether the parking brake assembly 118 is activated. For this purpose, the central control module 214 receives the value of the third pressure from the third pressure sensor 142. If the value of the third pressure is lesser than the third pressure threshold, the central control module 214 sends a command signal to the service brake assembly module 220 to de-energize the second solenoid 134 for deactivating the set of second brakes 130. In one example, the third pressure threshold and the predetermined fourth time period may be stored in the memory associated with the control module 210.

Further, if the third pressure sensor 142 is faulty or the control module 210 detects that the third pressure is greater than the third pressure threshold for the fourth time period, the control module 210 controls the set of second brakes 130 to deactivate the set of second brakes 130 based on a predetermined time period elapsed from the activation of the parking brake assembly 118. The predetermined time period from the activation of the parking brake assembly 118 is substantially greater than the fourth predetermined time period. More particularly, if the third pressure sensor 142 is faulty or if the third pressure of the parking brake assembly 118 is greater than the third pressure threshold for the fourth time period, the central control module 214 commands the service brake assembly module 220 to deactivate the set of second brakes 130 once the predetermined time period from the activation of the parking brake assembly 118 has elapsed. In one example, the predetermined time period elapsed from the activation of the parking brake assembly 118 may be stored in the memory associated with the control module 210.

Further, the control module 210 controls the clutch assembly 122 for deactivating the clutch assembly 122. The clutch assembly 122 is activated to prevent any movement of the machine 100 or a driveshaft associated with the transmission system. Further, the control module 210 controls the clutch assembly 122 to activate the clutch assembly 122 based on the second pressure of the set of second brakes 130 after deactivating the set of second brakes 130 being lesser than a fourth pressure threshold for a predetermined fifth time period. For this purpose, the central control module 214 receives the value of the second pressure from the second pressure sensor 138. If the value of the second pressure is lesser than the fourth pressure threshold, the central control module 214 sends a command signal to the clutch assembly module 218 to de-energize the clutch assembly solenoid 144 for deactivating the clutch assembly 122. In one example, the fourth pressure threshold and the predetermined fifth time period may be stored in the memory associated with the control module 210.

Figure 4:
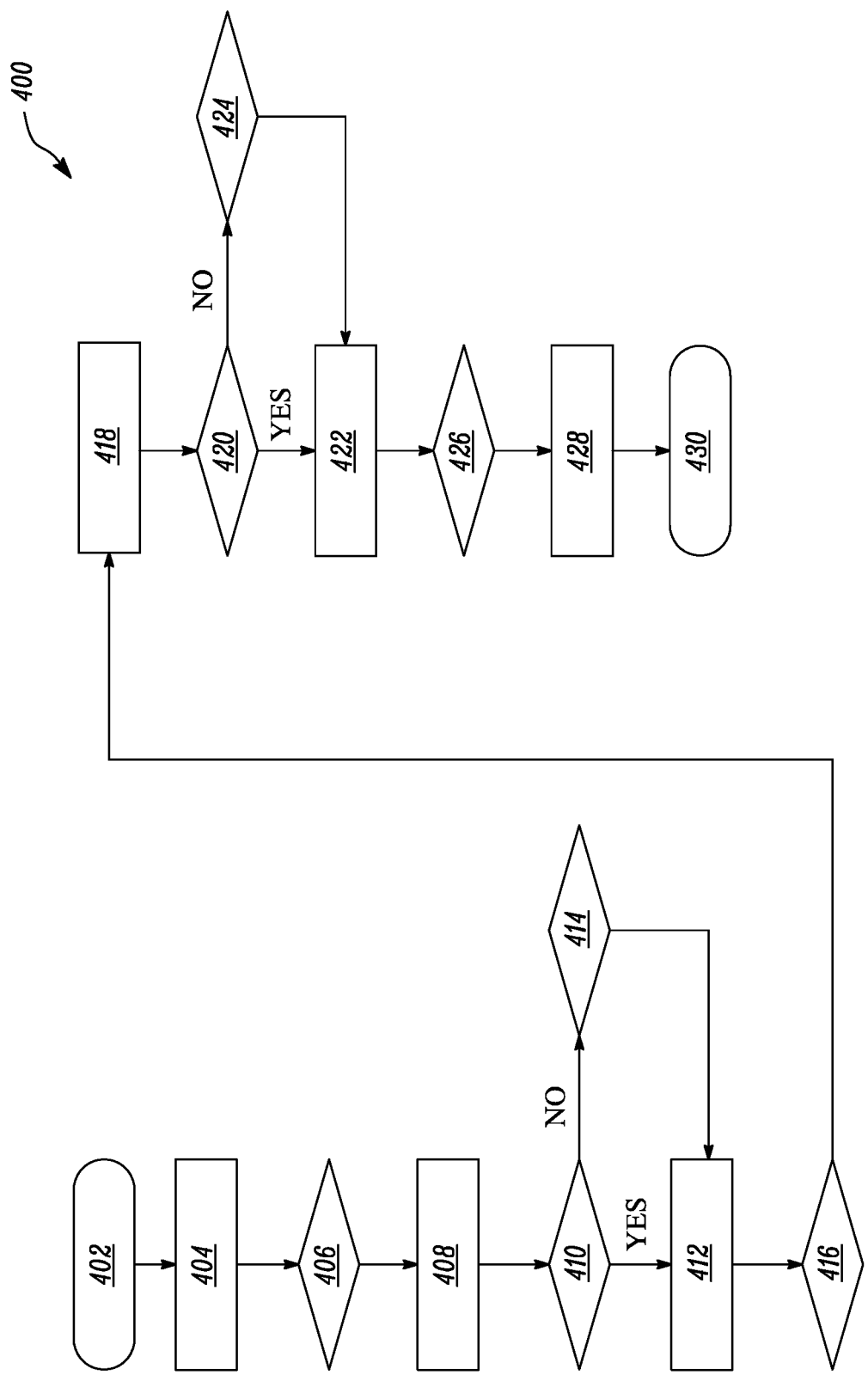
FIG. 4 illustrates a flowchart for a process implemented by the second control module of FIG. 3 for transitioning the machine from the service brake state to the parking brake state, in accordance with another embodiment of the present disclosure.

FIG. 4 illustrates a flowchart for the process 400 for controlling the machine 100 during the transition of the machine 100 from the service brake state to the parking brake state. The process 400 is embodied as a logic/algorithm implemented by the second control module 210 and may be stored in the memory of the second control module 210. Alternatively, the process 400 may be stored and implemented by any other ECM present on-board the machine 100, without any limitations.

At block 402, the process 400 is activated by the second control module 210. More particularly, the process 400 starts or begins operation at the block 402. The process 400 begins operation based on receipt of the parking brake request from the machine operator. It should be noted that when the process 400 begins operation, the parking brake status indicator 116 may provide an indication to the machine operator that the process 400 has been activated based on periodic blinking of the parking brake status indicator 116. The second control module 210 receives the parking brake request from the input device 126 via the input module 226. Alternatively, the process 400 may begin operation if the control module 210 is faulty, or one or more systems associated with the machine 100 have requested for immediate activation of the parking brake assembly 118.

The process 400 then moves to block 404. At the block 404, the central control module 214 receives the value of the pitch angle "P1" of the machine 100 from the sensing module 202. More particularly, the value of the pitch angle "P1" is received via the first control module 204 and the third sub-control module 212. The process 400 further moves to a block 406. At the block 406, the second control module 210 compares the value of the pitch angle "P1" with the predetermined threshold value. Further, at the block 406, the second control module 210 also determines if the current gear position corresponds to the neutral gear position. If the pitch angle "P1" is greater than the predetermined threshold value and the current gear position corresponds to the neutral gear position, the process moves to block 408.

At the block 408, the central control module 214 transmits the signal to the service brake assembly module 220 and the clutch assembly module 218 for activating the set of first brakes 128, the set of second brakes 130, and the clutch assembly 122. More particularly, the first solenoid 132 and the second solenoid 134 are fully energized for activating the set of first brakes 128 and the set of second brakes 130.

The process 400 further moves to a block 410. Further, at the block 410, the control module 210 compares the first pressure of the set of first brakes 128 and the second pressure of the set of second brakes 130 with the first pressure threshold. More particularly, the second control module 210 determines if the first pressure of the set of first brakes 128 and the second pressure of the set of second brakes 130 is greater than the first pressure threshold for the predetermined first time period. If the first pressure of the set of first brakes 128 and the second pressure of the set of second brakes 130 is greater than the first pressure threshold for the predetermined first time period, the process 400 moves to a block 412. At the block 412, the control module 210 controls the set of first brakes 128 to deactivate the set of first brakes 128. More particularly, the service brake assembly module 220 de-energizes the first solenoid 132 to deactivate the set of first brakes 128. However, if the second control module 210 determines that the first pressure of the set of first brakes 128 and the second pressure of the set of second brakes 130 is lesser than the first pressure threshold for the predetermined first time period, the process 400 moves to a block 414. At the block 414, the central control module 214 determines if the predetermined first time period from the activation of the first and second brakes 128, 130 has elapsed. After the elapse of the predetermined first time period, the process 400 moves to the block 412 to deactivate the set of first brakes 128.

Once the set of first brakes 128 are deactivated, the process 400 moves to a block 416. At the block 416, the central control module 214 determines if the machine operator is applying pressure on the brake pedal based on inputs from the brake pedal position sensor 135. If the central control module 214 determines that the machine operator is applying pressure on the brake pedal, the central control module 214 halts at the current state until the machine operator stops applying pressure on the brake pedal. When the central control module 214 determines that the machine operator is not applying pressure on the brake pedal, the central control module 214 compares the first pressure of the set of first brakes 128 with the second pressure threshold. More particularly, the second control module 210 determines if the first pressure of the set of first brakes 128 is lesser than the second pressure threshold for the predetermined third time period. If the first pressure of the set of first brakes 128 after deactivating the set of first brakes 128 is lesser than the second pressure threshold for the predetermined third time period, then the process 400 moves to a block 418. More particularly, at the block 418, the parking brake assembly 118 is controlled by the control module 210 to activate the parking brake assembly 118. The parking brake assembly module 222 energizes the third solenoid 140 to activate the parking brake assembly 118.

The process 400 then moves to a block 420. At the block 420, the central control module 214 determines if the third pressure sensor 142 is operating and transmitting signals corresponding to the third pressure of the parking brake assembly 118. If the third pressure sensor 142 is operating, the central control module 214 compares the third pressure of the parking brake assembly 118 after activating the parking brake assembly 118 with the third pressure threshold. If the central control module 214 determines that the third pressure of the parking brake assembly 118 after activating the parking brake assembly 118 is lesser than the third pressure threshold for the predetermined fourth time period, the process 400 moves to a block 422. At the block 422, the set of second brakes 130 is controlled by the control module 210 to deactivate the set of second brakes 130. More particularly, the service brake assembly module 220 de-energizes the second solenoid 134 to deactivate the set of second brakes 130.

However, if the central control module 214 determines that the third pressure sensor 142 is faulty or the third pressure of the parking brake assembly 118 is greater than the third pressure threshold for the predetermined fourth time period, the process 400 moves to a block 424. At the block 424, the central control module 214 determines if the predetermined time period from the activation of the parking brake assembly 118 has elapsed. After the elapse of the predetermined time period from the activation of the parking brake assembly 118, the process 400 moves to the block 422 to deactivate the set of second brakes 130.

The process 400 then moves to a block 426. At the block 426, the central control module 214 compares the second pressure of the set of second brakes 130 with the fourth pressure threshold. If the central control module 214 determines that the second pressure of the set of second brakes 130 after deactivating the set of second brakes 130 is lesser than the fourth pressure threshold for the predetermined fifth time period, the process 400 moves to a block 428. At the block 428, the control module 210 controls the clutch assembly 122 to deactivate the clutch assembly 122. More particularly, the clutch assembly module 218 de-energizes the clutch assembly solenoid 144 to deactivate the clutch assembly 122.

The process 400 then moves to block 430. At the block 430, the process 400 terminates or ends operation. It should be noted that when the process 400 terminates, the parking brake status indicator 116 may indicate that the process 400 has ended and the parking brake assembly 118 is activated. The parking brake status indicator 116 may provide the indication by transitioning from periodically blinking to a solid "ON" state such that the parking brake status indicator 116 glows of a single solid color.

The control module 206, 210 embodies a single microprocessor or multiple microprocessors for receiving signals from various components of the machine 100. Numerous commercially available microprocessors may be configured to perform the functions of the control module 206, 210. It should be appreciated that the control module 206, 210 may embody a machine microprocessor capable of controlling numerous machine functions. A person of ordinary skill in the art will appreciate that the control module may additionally include other components and may also perform other functions not described herein.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICATION

Figure 5:
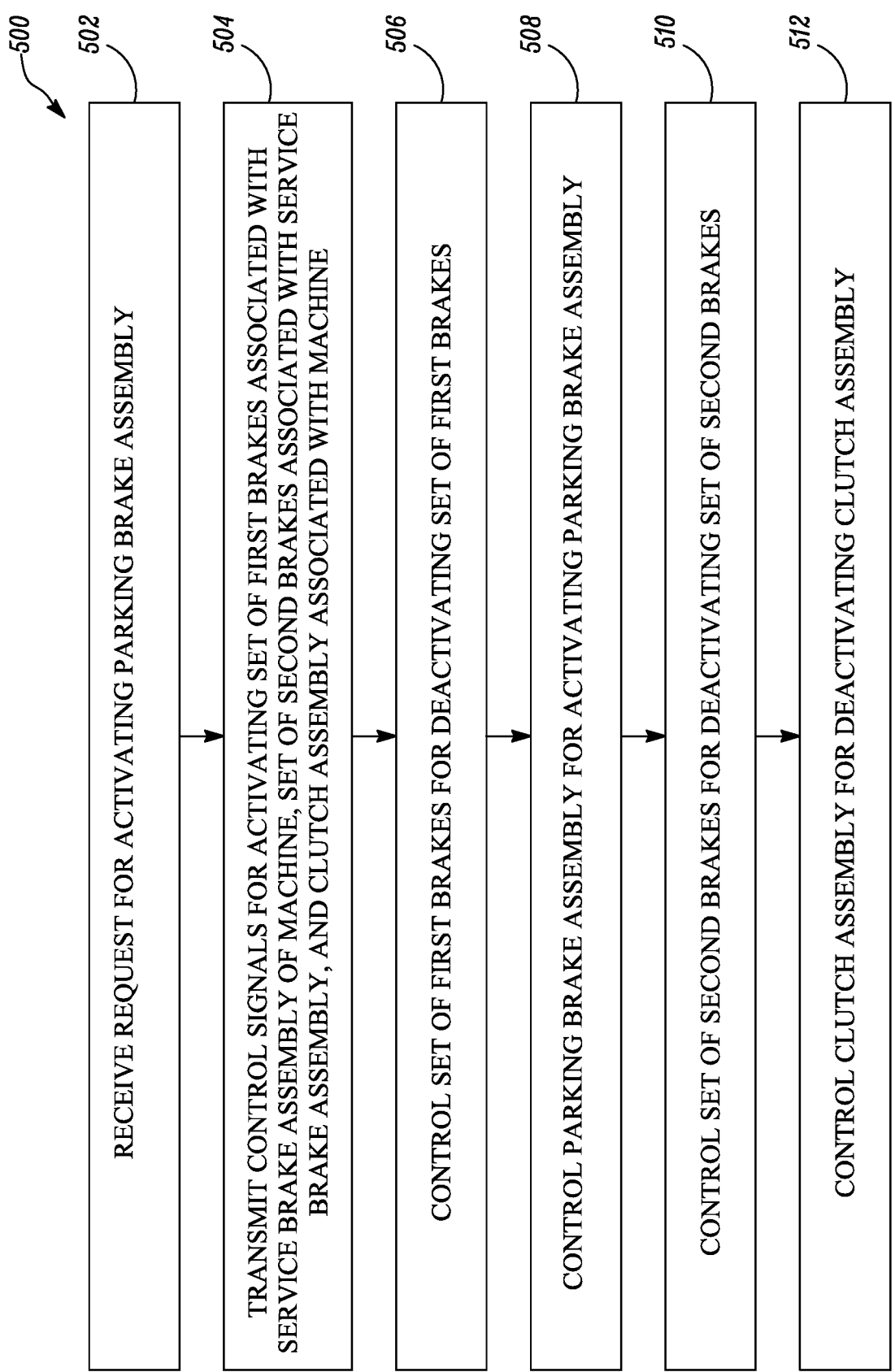
FIG. 5 is a flowchart for a method for controlling the machine during the transition from the service brake state to the parking brake state, in accordance with another embodiment of the present disclosure.

FIG. 5 is a flowchart for a method 500 for controlling the machine 100 during the transition from the service brake state to the parking brake state. At step 502, the control module 210 receives the request for activating the parking brake assembly 118. The control module 210 receives the request for activating the parking brake assembly 118 based on actuation of the input device 126 by the machine operator. In an example, the set of first brakes 128 is coupled with the set of front wheels 110 of the machine 100 and the set of second brakes 130 is coupled with the set of rear wheels 112 of the machine 100. In another example, the set of first brakes 128 is coupled with the set of rear wheels 112 of the machine 100 and the set of second brakes 130 is coupled with the set of front wheels 110 of the machine 100.

At step 504, the control module 210 transmits the control signals for activating the set of first brakes 128 associated with the service brake assembly 120 of the machine 100, the set of second brakes 130 associated with the service brake assembly 120, and the clutch assembly 122 associated with the machine 100. Further, the control module 210 receives the value of the pitch angle "P1" of the machine 100. The value of the pitch angle "P1" is received from the sensing module 202. The control module 210 activates the set of first brakes 128, the set of second brakes 130, and the clutch assembly 122 if the value of the pitch angle "P1" is above the predetermined threshold value.

At step 506, the control module 210 controls the set of first brakes 128 for deactivating the set of first brakes 128. The control module 210 controls the set of first brakes 128 to deactivate the set of first brakes 128 based on each of the first pressure of the set of first brakes 128 and the second pressure of the set of second brakes 130 being greater than the first pressure threshold for the predetermined first time period. Further, the control module 210 controls the set of first brakes 128 to deactivate the set of first brakes 128 based on the first pressure of the set of first brakes 128 or the second pressure of the set of second brakes 130 being lesser than the first pressure threshold and the predetermined second time period elapsed from the activation of the set of first brakes 128 and the set of second brakes 130. The predetermined second time period is substantially greater than the predetermined first time period.

At step 508, the control module 210 controls the parking brake assembly 118 for activating the parking brake assembly 118. The control module 210 controls the parking brake assembly 118 to activate the parking brake assembly 118 based on the first pressure of the set of first brakes 128 after deactivating the set of first brakes 128 being lesser than the second pressure threshold for the predetermined third time period. At step 510 the control module 210 controls the set of second brakes 130 for deactivating the set of second brakes 130. The control module 210 controls the set of second brakes 130 to deactivate the set of second brakes 130 based on the third pressure of the parking brake assembly 118 after activating the parking brake assembly 118 being lesser than the third pressure threshold for the predetermined fourth time period. At step 512, the control module 210 controls the clutch assembly 122 for deactivating the clutch assembly 122. The control module 210 controls the clutch assembly 122 to deactivate the clutch assembly 122 based on the second pressure of the set of second brakes 130 after deactivating the set of second brakes 130 being lesser than the fourth pressure threshold for the predetermined fifth time period.

The method 500 and the control system 200 for controlling the machine 100 described herein provides an automated and easy to implement solution that allows transitioning of the machine 100 from the service brake state to the parking brake state without causing machine rollback. More particularly, the control module 210 electronically controls the service brake assembly 120, the parking brake assembly 118, and the clutch assembly 122 in a precise sequence to keep the machine 100 in a stationary state during the transition from the service brake state to the parking brake state. The sequence is initiated and controlled by the control module 210 itself. Further, the sequence may be initiated based on receipt of the parking brake request from the machine operator. Once the set of first brakes 128 are deactivated, the control module 210 controls the parking brake assembly 118 so that the parking brake assembly 118 can attain a higher pressure thereby maintaining sufficient pressure on the brake discs and reducing a probability of machine rollback. Further, the technique of activating the parking brake assembly 118 after deactivating the set of first brakes 128 but before deactivating the set of second brakes 130 reduces a possibility of torque sparks and also eliminates binding of brake discs, thereby providing smoother operation of the service brake assembly 120 and the parking brake assembly 118 without causing machine rollback.

It should be further noted, based on a type of the machine 100, the control module 210 may be programmed to deactivate the front brakes of the machine 100, activate the parking brake assembly 118, and then deactivate the rear brakes of the machine 100. In other cases, based on the type of the machine 100, the control module 210 may be programmed to deactivate the rear brakes of the machine 100, activate the parking brake assembly 118, and then deactivate the front brakes of the machine 100

The transition from the service brake state to the parking brake state is implemented in a short period of time and the machine 100 is retained in the stationary state during this transition. Moreover, as the method 500 is embodied as an automated method that is implemented by the control module 210 that does not depend on human interference, the method 500 is less susceptible to failures or human errors. Further, the method 500 reduces the possibility of machine rollback, thereby ensuring that the machine components are not subjected to any kind of damage. Further, the control system 200 described herein can be retrofitted on existing machines with minimum modifications to machine hardware. Moreover, the teachings described herein can be applied to a variety of machines such as load haul dumps, medium wheel loaders, large wheel loaders, or other machines that move across different terrains having steep slopes with large amounts of payload.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for controlling a machine during a transition from a service brake state to a parking brake state, the method comprising:
   receiving, by a control module, a request for activating a parking brake assembly;
   transmitting, by the control module, control signals for activating a set of first brakes associated with a service brake assembly of the machine, a set of second brakes associated with the service brake assembly, and a clutch assembly associated with the machine;
   controlling, by the control module, the set of first brakes for deactivating the set of first brakes;
   controlling, by the control module, the parking brake assembly for activating the parking brake assembly;
   controlling, by the control module, the set of second brakes for deactivating the set of second brakes; and
   controlling, by the control module, the clutch assembly for deactivating the clutch assembly while the parking brake assembly remains activated; and
   controlling by the control module, the set of first brakes to deactivate the set of first brakes based on;
   each of a first pressure of the set of first brakes and a second pressure of the set of second brakes being greater than a first pressure threshold for a predetermined first time period; and
   at least one of the first pressure of the set of first brakes and the second pressure of the set of second brakes being lesser than the first pressure threshold and a predetermined second time period elapsed from the activation of the set of first brakes and the set of second brakes, wherein the predetermined second time period is greater than the redetermined first time period.

2. The method of claim 1 further comprising receiving, by the control module, the request for activating the parking brake assembly based on actuation of an input device by a machine operator.

3. The method of claim 1 further comprising receiving, by the control module, a value of a pitch angle of the machine.

4. The method of claim 3 further comprising activating, by the control module, the set of first brakes, the set of second brakes, and the clutch assembly if the value of the pitch angle is above a predetermined threshold value.

5. The method of claim 1 further comprising controlling, by the control module, the parking brake assembly to activate the parking brake assembly based on the first pressure of the set of first brakes after deactivating the set of first brakes being lesser than a second pressure threshold for a predetermined third time period.

6. The method of claim 1 further comprising controlling, by the control module, the set of second brakes to deactivate the set of second brakes based on a third pressure of the parking brake assembly after activating the parking brake assembly being lesser than a third pressure threshold for a predetermined fourth time period.

7. The method of claim 1 further comprising controlling, by the control module, the clutch assembly to deactivate the clutch assembly based on the second pressure of the set of second brakes after deactivating the set of second brakes being lesser than a fourth pressure threshold for a predetermined fifth time period.

8. The method of claim 1 further comprising coupling the set of first brakes with a set of front wheels of the machine and the set of second brakes with a set of rear wheels of the machine.

9. The method of claim 1 further comprising coupling the set of first brakes with the set of rear wheels of the machine and the set of second brakes with the set of front wheels of the machine.

10. A control system for a work machine including a service brake assembly, a parking brake assembly, and a clutch assembly, the control system comprising a control module communicably coupled with the service brake assembly, the parking brake assembly, and the clutch assembly, wherein the control module is configured to:
receive a request for activating the parking brake assembly;
transmit control signals for activating a set of first brakes associated with the service brake assembly, a set of second brakes associated with the service brake assembly, and the clutch assembly;
control the set of first brakes for deactivating the set of first brakes;
control the set of parking brake assembly for activating the parking brake assembly;
control the set of second brakes for deactivating the set of second brakes; and
control the clutch assembly for deactivating the clutch assembly while the parking brake assembly remains activated; and
wherein the control module is configured to control the parking brake assembly to activate the parking brake assembly based on the first pressure of the set of first brakes after deactivating the set of first-brakes being lesser than a second pressure threshold for a predetermined third time period.

11. The control system of claim 10, wherein the control module is configured to receive the request for activating the parking brake assembly based on actuation of an input device by a machine operator.

12. The control system of claim 10 further comprising a sensing module configured to generate an input signal corresponding to a value of a pitch angle of the work machine.

13. The control system of claim 12, wherein the control module is configured to transmit the control signals for activating the set of first brakes, the set of second brakes, and the clutch assembly if the value of the pitch angle is above a predetermined threshold value.

14. The control system of claim 10, wherein the control module is configured to control the set of first brakes to deactivate the set of first brakes based on:
each of a first pressure of the set of first brakes and a second pressure of the set of second brakes being greater than a first pressure threshold for a predetermined first time period; and
at least one of the first pressure of the set of first brakes and the second pressure of the set of second brakes being lesser than the first pressure threshold and a predetermined second time period elapsed from the activation of the set of first brakes and the set of second brakes, wherein the predetermined second time period is greater than the predetermined first time period.

15. The control system of claim 10, wherein the control module is configured to control the set of second brakes to deactivate the set of second brakes based on a third pressure of the parking brake assembly after activating the parking brake assembly being lesser than a third pressure threshold for a predetermined fourth time period.

16. The control system of claim 10, wherein the control module is configured to control the clutch assembly to deactivate the clutch assembly based on the second pressure of the set of second brakes after deactivating the set of second brakes being lesser than a fourth pressure threshold for a predetermined fifth time period.

17. The control system of claim 10, wherein the set of first brakes is coupled with a set of front wheels of the work machine and the set of second brakes is coupled with a set of rear wheels of the work machine.

18. The control system of claim 17, wherein the set of first brakes is coupled with the set of rear wheels of the work machine and the set of second brakes is coupled with the set of front wheels of the work machine.

\* \* \* \* \*